June 29, 1926.
F. D. BOGDAN
1,590,412
SAW GRINDING ATTACHMENT FOR SAW TRIMMERS
Filed March 24, 1925    2 Sheets-Sheet 1
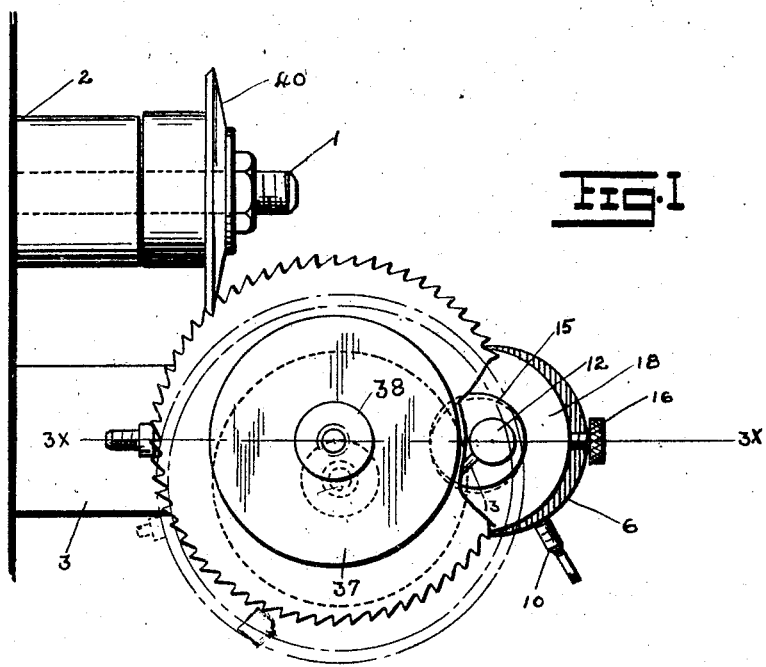
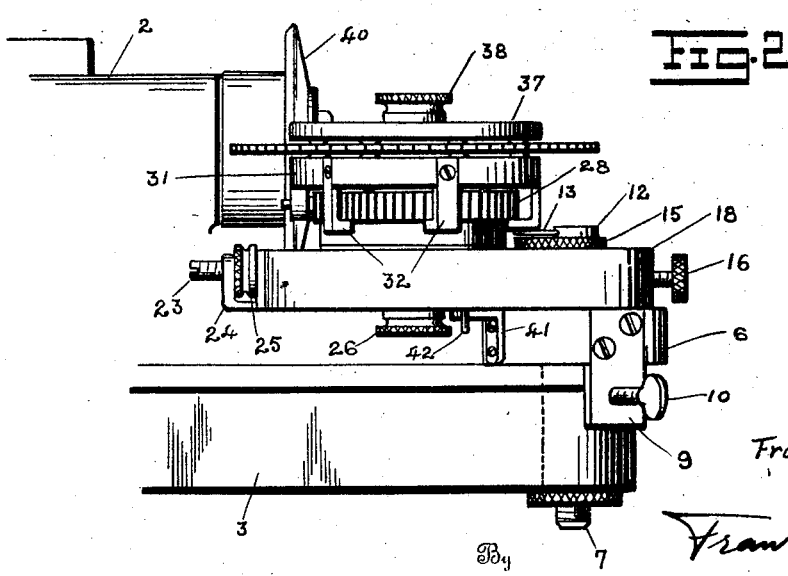
Inventor
Frank D. Bogdan
By Frank Keiper
Attorney June 29, 1926.
F. D. BOGDAN
1,590,412
SAW GRINDING ATTACHMENT FOR SAW TRIMMERS
Filed March 24, 1925    2 Sheets-Sheet 2
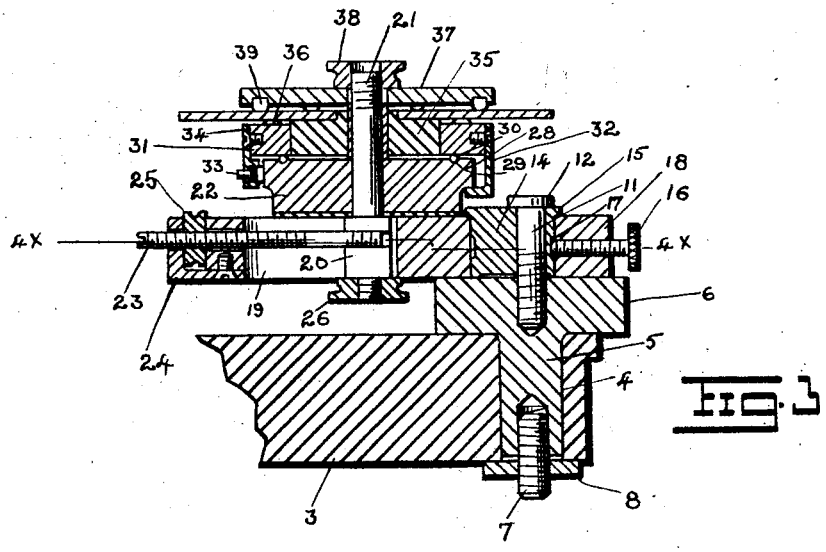
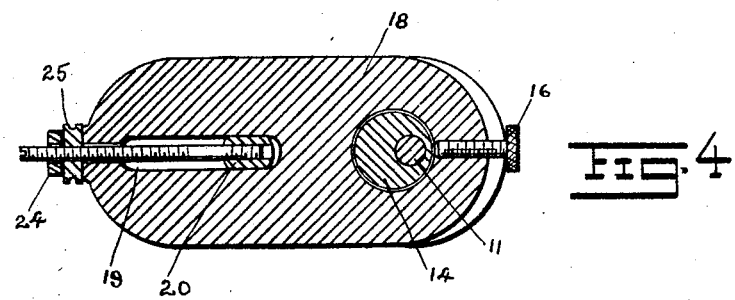
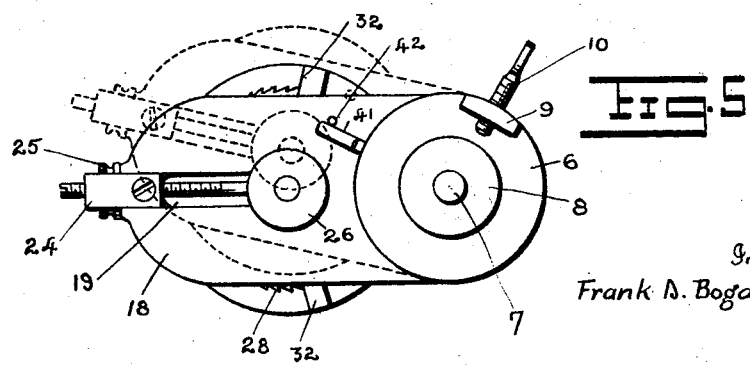
Inventor
Frank D. Bogdan
By Frank Keiper
Attorney Patented June 29, 1926.

1,590,412

UNITED STATES PATENT OFFICE.

FRANK D. BOGDAN, OF ROCHESTER, NEW YORK.

SAW-GRINDING ATTACHMENT FOR SAW TRIMMERS.

Application filed March 24, 1925. Serial No. 17,918.

The object of this invention is to provide a new and improved attachment for a saw trimmer by means of which the circular saws used in the trimmer can be quickly and easily sharpened.

This and other objects of this invention will be fully illustrated in the drawings, described in the specification and pointed out in the claims at the end thereof.

In the accompanying drawings:

Figure 1 is a top plan view of a portion of the bed and spindle of a saw trimmer with the saw grinding attachment attached thereto.

Figure 2 is a side elevation of the same parts of the saw trimmer and the saw grinding attachment.

Figure 3 is a vertical sectional view of the saw grinder attachment, the section being taken on the line $3^x$—$3^x$ of Fig. 1.

Figure 4 is a horizontal sectional view of the saw grinder attachment, the section being taken on the line $4^x$—$4^x$ of Figure 3.

Figure 5 is a bottom plan view of the saw grinder attachment.

In the several figures of the drawing like reference numerals indicate like parts.

The saw grinding attachment forming the subject matter of this invention is intended for use in connection with saw trimmers used in the composing room for sawing, trimming and reducing slugs, wood bases and perform many other operations that are incidental to setting up type, halftones, electrotypes in catalogue work, and advertising, and other printing.

The grinding attachment is constructed so that it can be readily attached to the saw trimmer and grind the saw used in the saw trimmer. Such a saw trimmer is provided with a spindle 1 that is suitably mounted to rotate in bearings provided in a frame or standard 2. An arm 3 projects from this frame or standard that is provided with a vertical hole 4 in the outer end thereof. This hole forms a sleeve into which the standard 5 of the saw grinding attachment is inserted. The standard 5 comprises a cylindrical post formed centrally on the under side of the base 6. In the end of the post is provided a threaded stud 7 on which is threaded a nut 8. This nut when threaded against the under side of the arm 3 draws the base 6 down on to the top of the arm and holds the base in place on the arm.

To additionally fasten the base 6 in place on the end of the arm 3 of the saw trimmer and especially prevent a possible rotation of the standard 5 in the hole 4 a downwardly projecting lug 9 is provided on the side of the base 6. This lug carries near the lower end thereof a set screw 10 which is suitably threaded therein so that the set screw can be screwed against the side of the arm 3 and hold the base against rotation on the arm as above pointed out.

Threaded into the center of the base 6 is the clamping stud 11. This stud is provided with the flat head 12 from which projects a short arm or handle 13, by means of which the clamping stud may be rotated. Surrounding the stud 11 above the base 6 is the eccentric bushing 14. This bushing is provided with a knurled flange 15 by means of which it may be rotated around the clamping stud for a purpose that will presently appear. A set screw 16 is threaded into the side of the bed plate 18 and is adapted to engage into a shallow annular groove 17 on the eccentric sleeve or bushing and engage the eccentric to hold it against rotation in the bed plate 18. The eccentric bushing when rotated around the stud 11 shifts the bed plate laterally over the base 6 for the purpose of adjusting it in a predetermined position thereon.

The bed plate 18 is provided with an elongated opening 19 in which the lug 20 is adapted to slide back and forth. This lug is formed on the end of the pivot stud 21 on which the saw support 22 is mounted to rotate. The lug 20 has the feed screw 23 threaded into it or otherwise suitably fastened thereto so that it extends from the lug the length of the slot and thru a bearing in the end of the bed plate. A bracket 24 is provided on the outside of the bed plate that carries another bearing in which the end of the feed screw 23 is mounted to rotate. The feed screw has a knurled nut 25 threaded thereon that is located in the space between the bracket 24 and the end of the bed plate 18. On the rotation of the nut 25 the feed screw is moved in or out in the slot 19 and slides the lug 20 back and forth in the slot so as to move the pivot stud 21 laterally on the bed plate 18. After the desired location for the pivot stud has been found it is locked in place by means of the locknut 26 that is threaded on the threaded extension of the lug 20. When this nut is tightened it locks the lug 20 in place in the slot 19 and holds the pivot stud rigid on the bed plate 18.

The lower end of the pivot stud 21 is surrounded by the stationary ratchet disk 28 that is suitably fastened thereto. This disk has a ball race 29 formed on the face thereof in which the balls 30 are placed to form a ball bearing for the supporting disk 31 to turn thereon. The ratchet teeth overhang the ratchet disk 28 and form a flange thereon. The supporting disk 31 carries a series of depending brackets 32 on its periphery that have inwardly extending projections on the lower end. These projections engage under the overhanging flange formed by the ratchet teeth and hold the supporting disk in place on top of the ratchet disk 28, but permit its rotation thereon.

The supporting disk also carries on its periphery the bracket 34 in the low end of which is mounted the spring pressed pawl 33. This pawl is held yieldingly in engagement with the ratchet teeth allowing the disk 31 to be rotated in but one direction on the stationary ratchet disk. The center of the supporting disk 31 is hollow to receive the trimmer head 35 provided on the circular saw to be sharpened by means of the attachment. In the top of the supporting disk 31 are provided a series of rubber pads 36 on which the saw rests when it is placed on the supporting disk. The saw is clamped in place by means of the clamping plate 37 that is centered on the pivot stud and is forced on top of the saw by means of the clamping nut 38. This nut is threaded on the upper end of the pivot stud 21 and is threaded down onto the clamping plate until the saw is firmly clamped between the rubber pads 39 carried on the under side of the clamping plate 37 and the rubber pads 36 provided on the top of the supporting disk. This holds the saw firmly in place on the supporting disk and prevents any possible rotation thereof during the grinding operation on the teeth of the saw.

When the saw grinding attachment is attached to the trimmer as above described, and the circular saw to be sharpened by means of the attachment is mounted on the attachment it must be properly lined up with the grinding wheel 40 mounted on the spindle 1 of the saw trimmer. This grinding wheel is formed specially for grinding the saw teeth and the right hand side of this wheel is dished while its outer edge is beveled on both sides so that the outer end of the wheel will fit into the throat of each tooth and grind each tooth at the throat and the top thereof, as illustrated in Fig. 1.

Before the saw is fed against the grinding wheel it must be adjusted so that the grinding wheel will fit into the teeth of the saw. For this purpose the bed plate 18 is first adjusted on the eccentric bushing 14. This is done by releasing the clamping bolt 12 so that the bushing can be rotated by means of its knurled flange 15. In rotating the eccentric bushing the bed plate is shifted either toward or away from the spindle and when the proper position of the bed plate has been found the bushing is clamped in place in the bed plate by means of the set screw 16 that is threaded into the side or end of the bed plate. The set screw is thereby forced against the eccentric bushing to prevent a further rotation therein. When this initial setting of the bed plate has been made, the supporting disk with the saw mounted thereon is adjusted on the bed plate by rotating the feed screw 23 until the teeth of the saw fit against the beveled edges of the grinding wheel 40.

The nut 25 for shifting the feed screw 23 is graduated on the periphery into so called points and when it is rotated, the amount that it feeds the screw in or out of the bed plate is indicated by the graduation on the nut 25. Ordinarily each graduation indicates a point so that when the saw has been fitted against the wheel and the nut is advanced one graduation the pivot stud 21 with the supporting disk and saw mounted thereon is shifted one point and the grinding wheel will grind off a corresponding amount from each tooth as it is placed agaist the grinding wheel.

As illustrated in Figures 2 and 5 the base 6 is provided with an outwardly projecting bracket 41 that is located under the bed plate 18. On the bed plate is provided a stop pin 42 which projects downwardly from the bed plate and serves as a stop for the bed plate, that limits its swinging motion on the base 6.

When a saw has been mounted on the attachment and the attachment has been adjusted as above pointed out so as to grind off a predetermined amount from each tooth, when it is fed against the grinding wheel the clamping bolt 11 is slightly released to allow the bed plate to swing thereon. This permits the bed plate to swing away from the grinding wheel carrying the saw with it so that it is held clear of the grinding wheel. The supporting disk with the circular saw clamped thereon can be turned step by step until it has been shifted toon tooth on the stationary ratchet. The bed plate is then again swung towards the grinding wheel and the next tooth is engaged by the grinding wheel and sharpened thereby. This operation is repeated until all of the teeth of the saw have been brought in contact with the grinding wheel and sharpened an equal amount it being understood that the ratchet is provided with the same number of ratchet teeth as there are teeth provided in the circular saw that is ground with this attachment.

I claim:

1. In a grinding attachment for saw trimmers, the combination of a supporting post, a bed plate mounted to swing on said post in a horizontal plane, means for adjusting said bed plate laterally with relation to the center of said supporting post, a pivot pin carried by said bed plate, means for laterally adjusting said pivot pin on said bed plate, a supporting disk mounted to rotate on said pivot pin, means for advancing said supporting disk step by step, means for clamping a circular saw in place on said supporting disk.

2. In a grinding attachment for saw trimmers, the combination of a supporting post, means for clamping said post in place on the frame of the saw trimmer, a bolt carried centrally of said post, an eccentric bushing surrounding said bolt, a bed plate, said eccentric bushing extending into said bed plate, a horizontal feed screw mounted to rotate in said bed plate, a nut carried by said bed plate and threaded on said feed screw for moving said feed screw in or out of said bed plate, a lug fastened to the end of said feed screw and adapted to slide in said bed plate, a pivot stud carried by said lug, a stationary ratchet disk mounted on said pivot stud, a supporting plate centered on said pivot stud and adapted to rotate on said stationary ratchet disk, means for holding said supporting disk in place on said stationary ratchet disc, a spring pressed pawl carried by said rotating supporting disc and adapted to engage the teeth of said stationary ratchet disk and prevent the rotation of said supporting disc in one direction, a clamping plate adapted to be centered on said pivot stud and clamp a circular saw in place on said supporting disk.

3. In a grinding attachment for saw trimmers, the combination of a supporting post, a bed plate mounted to swing on said supporting post, a pivot stud adjustably mounted on said bed plate, a rotating supporting disk mounted on said pivot stud, means for clamping a saw on said supporting disk, means for shifting the bed plate in a horizontal plane with relation to said supporting post and means for shifting said pivot stud in a horizontal plane with relation to said bed plate.

4. In a grinding attachment for saw trimmers, the combination of a horizontally swinging bed plate, a stationary ratchet disk mounted on said bed plate, a pivot stud projecting from said stationary ratchet disk, a supporting disk mounted to rotate on top of said stationary ratchet disk, depending brackets carried on the periphery of said supporting disk said brackets being adapted to engage under the teeth of said ratchet disk and hold said supporting disk and adapted to engage the teeth of said ratchet disk.

5. In a grinding attachment for saw trimmers, the combination of a supporting post, a bed plate mounted to swing in a horizontal plane on said post, a pivot pin carried by said bed plate, a supporting disk mounted on said pivot pin, means for adjusting said pivot pin with relation to said supporting post, and means for clamping a circular saw in place on said supporting disk.

In testimony whereof I affix my signature.

FRANK D. BOGDAN.